United States Patent Office 2,940,813
Patented June 14, 1960

2,940,813
VAT DYE COMPOSITIONS CONTAINING AZOLES

John Taras, Alpha, N.J., and David I. Randall, Easton, Pa., assignors to General Aniline & Film Corporation, New York, N.Y., a corporation of Delaware No Drawing. Filed Dec. 4, 1953, Ser. No. 396,348

6 Claims. (Cl. 8—35)

This invention relates to improved printing compositions containing a salt of a polybasic acid ester of the leuco form of vat dyestuffs and an azole selected from the group consisting of imidazoles and benzimidazoles.

The printing of textile materials with ester salts of leuco vat dyestuffs is well known to the art. The process involves dissolving the ester salt of the leuco vat dyestuff in water and adding a thickening agent to form the printing paste which is applied to the textile material in several known ways, after which the insoluble parent vat dyestuff is fixed on the fibers by the hydrolysis and oxidation which takes place in the "ageing" process which is generally one of two kinds. In the acid ageing process for the development of the print, acid steam is applied along with treatment of the impregnated fabric with an acid solution of an oxidizing agent. Where an acid-liberating agent and an oxidizing agent have been incorporated in the printing paste, development of the print takes place with the application of ordinary steam. The printed material is then rinsed, soaped and finished.

The solubility in water of the ester salts of the leuco vat dyestuffs is due to the presence in the molecule of one or more polybasic and ester groups. This solubility varies widely and is dependent chiefly on the character of the parent vat dyestuff. In the case of sodium salts of the sulfuric acid esters of the leuco vat dyestuffs, some of these are easily soluble in water, whereas others, being considerably less soluble, are readily salted out by the presence in the printing paste of electrolytes usually employed in the printing, most commonly ammonium thiocyanate for the acid-liberating function, and sodium chlorate for the oxidation step. The selection of vat dyestuffs for use in the printing of textiles is accordingly limited to those, the leuco ester salts of which possess the required solubility in water.

In the interest of providing stable printing pastes containing a soluble salt of the sulfuric acid ester of leuco vat dyestuffs and of employing therein leuco ester salts of low solubility, thus to provide a wider range of selection in the vat dyestuffs, more work has been done by way of adding to the printing compositions various quantities of organic solvents such as alcohols, ethylene glycol, etc., and of other printing assistants of a variety of chemical species. Despite the many excellent printing assistants which have been added to printing pastes, there are certain vat dyestuffs, for example, 2,1-naphthioindigo, which yield sulfuric acid ester salts which are so difficultly soluble in water which renders printing impossible unless there is formulated into the print paste certain so-called solubilizing agents.

We have found that improved dyestuff compositions containing salts of polybasic acid esters, especially sulfuric acid esters of leuco vat dyestuffs (hereinafter referred to for sake of simplicity as ester salts of leuco vat dyestuffs) are readily obtained by incorporating with the ester salt of the leuco vat dyestuff an azole compound selected from the group consisting of imidazoles and benzimidazoles (hereinafter referred to for sake of simplicity as azoles). These azoles are characterized by the following general formulae:

(1) 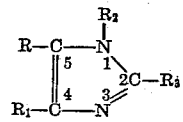

(2) 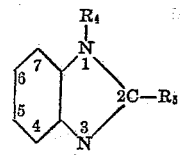

wherein R represents either hydrogen or phenyl radical, $R_1$ represents either hydrogen, lower alkyl, e.g., methyl, ethyl, propyl, etc., lower aminoalkyl, e.g., aminomethyl, aminoethyl, aminopropyl, etc., hydroxymethyl, carboxy, carboxymethyl, carboxyethyl or phenyl radical, $R_2$ represents either hydrogen, lower alkyl as in $R_1$, lower hydroxyalkyl, e.g., hydroxymethyl, hydroxyethyl, hydroxypropyl, etc., carboxy, carboxy-lower alkyl, e.g., carboxymethyl, carboxyethyl, carboxypropyl, etc., phenyl or benzyl radical, $R_3$ represents either hydrogen, lower alkyl as in $R_1$, lower hydroxyalkyl and carboxylower alkyl as in $R_2$ or phenyl radical, $R_4$ represents either acetyl, hydrogen, hydroxy, lower alkyl as in $R_1$, or cyano lower alkyl, e.g., cyanoethyl, β-cyanoethyl, α-cyanopropyl, etc., and $R_5$ represents either hydrogen, lower alkyl as in $R_1$, lower hydroxyalkyl as in $R_2$, amino or 1,2,3,4-tetrahydroxypentyl radical.

As examples of such azoles, the following are illustrative:

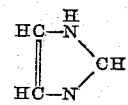
Imidazole

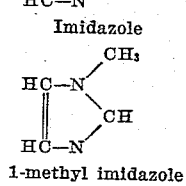
1-methyl imidazole

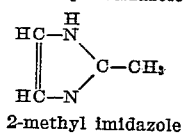
2-methyl imidazole

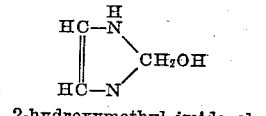
2-hydroxymethyl imidazole

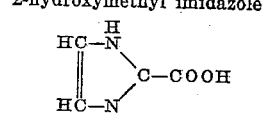
Imidazole-2-carboxylic acid

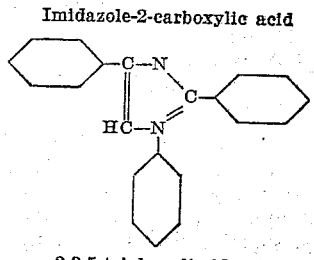
2,3,5-triphenylimidazole

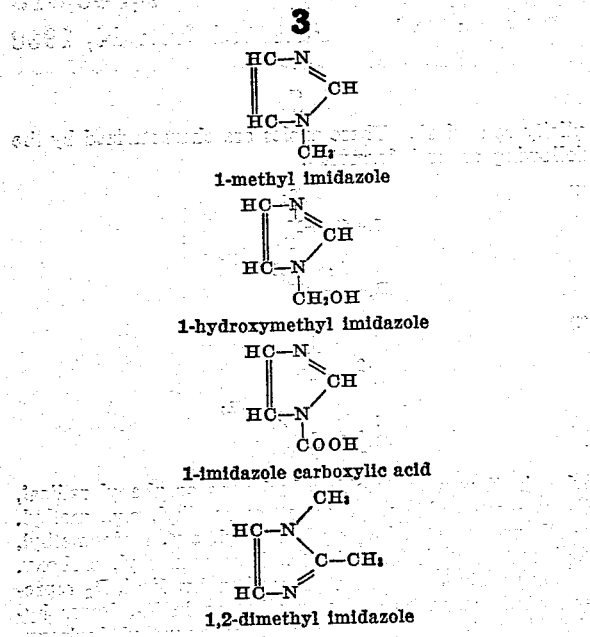

1-methyl imidazole 1-hydroxymethyl imidazole 1-imidazole carboxylic acid 1,2-dimethyl imidazole In addition to the foregoing imidazoles the following are also employed:

1-ethylimidazole
1-propylimidazole
2,4-dimethylimidazole
4,5-diphenylimidazole
4,5-diphenyl-2-ethylimidazole
1-phenylimidazole
1-benzylimidazole
Imidazolylacrylic acid
4[4-imidazolyl]-n-butylamine
2[4-imidazolyl]-lactic acid
4-imidazolylmethylamine
1-β-hydroxyethylimidazole
4-hydroxymethylimidazole
4-imidazolylcarboxylic acid
4-imidazolylacetic acid
1-imidazolylacetic acid
4-imidazole carboxylic acid
2-imidazolylacetic acid The following are illustrative of the benzimidazoles which are employed in accordance with the present invention:

Benzimidazole
1-methylbenzimidazole
1,3-dimethylbenzimidazole
1-hydroxybenzimidazole
2-methylbenzimidazole
5-methylbenzimazole
1,5-dimethylbenzimidazole
2-hydroxymethylbenzimidazole

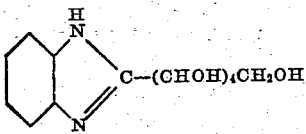

2[1,2,3,4-tetrahydroxypentyl]benzimidazole
2-aminobenzimidazole
1(β-cyanoethyl)-benzimidazole
1(β-cyanoethyl)-2-hydroxymethylbenzimidazole
1-acetylbenzimidazole The incorporation of the foregoing azoles into compositions of ester salts of leuco vat dyestuffs not only improves the solubility of the less soluble ester salts of the leuco vat dyestuffs, but also yields superior print paste stability, superior tinctorial quality of the textile prints, both in respect to tinctorial strength and brilliancy, and superior print paste solubility.

The azole compounds may be incorporated directly into the printing pastes, or they may be first mixed with the ester salt of the leuco vat dyestuff. They may be used singly or in admixture with one another. In other words, one or more imidazoles or one imidazole in admixture with a benzimidazole may be added to the dyestuff compositions. The amount of the azole or mixtures thereof which may be incorporated into the dyestuff composition may be very considerable. For example, the amount utilized in one case may depend upon the solubility of the ester salt of the vat dyestuff as well as the activity of the particular azole or azole mixture employed. For practical purposes regardless of the solubility of the ester salt of the vat dyestuff, we have found that superior print paste solubility, superior tinctorial properties and superior print paste stability are obtained when from about one-quarter to four parts by weight of the azole compound or mixtures thereof are used for each part of the parent vat dyestuff of the ester salt. In addition, in many cases an excess of the azole or mixtures thereof may be used, the excess merely acting as a diluent. The unusual aspect of the azoles and mixtures thereof is that they do not interfere with the other agents normally employed in the preparation of printing pastes containing salts of sulfuric acid esters of leuco vat dyestuffs. Thus, in preparing printing pastes or powders with these vat dyestuff ester salts, the azoles or mixtures thereof may be used to replace part of the water or the solid diluent in the standardization of the dyestuff composition. Additional substances having diluent, anti-foaming, wetting, catalytic or other desired action, may be included in the dyestuff compositions prepared in accordance with the present invention. The various substances that may be so employed as well known to the art and need not be exemplified herein. However, for purposes of specific illustration such substances as sodium sulfate or sodium carbonate will serve as diluents or alkaline agents, organic fillers such as dextrose, dextrines and the like, and catalytic substances such as ammonium vanadate and the like.

The ester salts of leuco vat dyestuffs useful in the preparation of the printing paste compositions of the present invention include all of those that are prepared from various classes of vat dyestuffs such as, for example, vat dyestuffs containing the anthraquinone-acridine, dibenzanthrone, isodibenzanthrone, anthanthrone, dianthraquinone-azine, anthraquinone-diphenylthiazole, nucleus and the like which may be found in various literature including the "Color Index" No. 1094ff and 1177ff; pp. 248–291. Inclusive of such dyes are also leuco ester salts of vat dyes and leuco compounds of vat dyes prepared by careful acidification of an alkaline vat. A particularly valuable class of these ester compounds of the alkali metal, such as sodium and potassium and amine salts, such as trimethyl amine and triethanol amine salts of polybasic acid esters of leuco vat dyestuffs. The polybasic acid esters may be prepared either from sulfuric or phosphoric acid.

By the term "leuco vat dyestuffs" as employed herein is meant the reduced or vatted form of anthraquinone, indigoid or thioindigoid dyestuffs, such as those described in U.S.P. 1,639,206; 1,668,392; 1,747,107; 1,646,018, 1,448,251, 1,448,231, 1,880,996, 1,826,720; British Patents 473,471 and 438,841, German Patents 441,101, 516,845, 486,174, 491,876, and the like. While the azoles of the present invention may be used with all of the classes of salts of esters of leuco vat dyestuffs they are especially adaptable for the less soluble leuco vat dyestuffs.

As specific examples of the salts of the polybasic acid esters of the leuco form of vat dyes which may be employed in the preparation of printing paste compositions, the following are illustrative:

(1) The disodium salt of the disulfuric acid ester of the leuco form of the anthraquinone-acridine dye of the following formula:

compound of chlorinated iso-dibenzanthrone of the following formula:

(2) The disodium salt of the disulfuric acid ester of the leuco form of the dinaphthioindigo of the following formula:

(6) Tetra-potassium salt of the sulfuric acid ester of 3,3'-dichlorodi-anthrahydroquinone azine of the following formula:

(3) Disodium salt of the sulfuric acid ester of the leuco form of 2,1,5,4-anthraquinone-di-phenylthiazole of the following formula:

(7) Dipotassium salt of the acid sulfuric acid of the leuco compound of dimethoxy-dibenzanthrone:

(4) Disodium salt of the sulfuric acid ester of the leuco form of the dibromo-anthanthrone of the following formula:

(5) Disodium salt of the sulfuric acid of the leuco (8) Dipotassium salt of the acid sulfuric acid ester of the leuco compound of dimethyl-dibenzanthrone of the following formula:

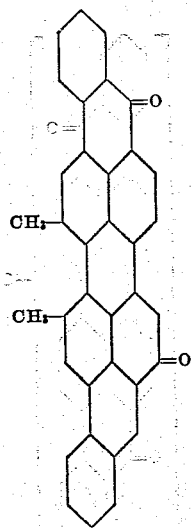

(9) Dipotassium salt of the sulfuric acid ester of the leuco form of dinaphthioindigo of illustration 2.

The following examples will show the manner in which the present invention may be practiced. All the parts given therein are by weight unless otherwise specified. It is to be noted, however, that the invention is not to be limited to these examples since many changes may be made in the materials treated and their proportions, manipulative steps, and other conditions without departing from the scope and spirit of the invention claimed.

*Example I*

A. A powdered dyestuff composition is prepared by grinding together in the dry state, screening and milling:

100 parts of a dry dyestuff composition containing the sodium salt of the sulfuric acid ester of the leuco compound of the anthraquinone-acridine dyestuff having the formula of illustration 1
40 parts of 2-hydromethylbenzimidazole
13 parts of sodium sulfate The final concentration of the parent vat dyestuff in the dry composition is 26.6%.

B. A powdered dyestuff composition is made up as in A with the exception that the 2-hydroxymethylbenzimidazole is omitted and 53 parts of the diluent sodium sulfate is substituted therefor. The concentration of the parent vat dyestuff in the dry composition is the same (26.6%).

A printing paste is prepared from each of these dyestuff compositions, A and B, in the following manner:

4 parts each of the dyestuff compositions A and B is separately mixed with
4 parts β,β'-dihydroxy diethylsulfide
4 parts urea and finally dissolved by adding
18 parts warm water and holding in a boiling water bath for 2 minutes These solutions are then each mixed with:

60 grams parts of starch-tragacanth thickening and
4 parts of a 35% sodium chlorate solution
2 parts 1% ammonium vanadate solution
2 parts 28% ammonia
2 parts 50% gluconic acid solution Cotton cloth is printed with a portion of each of the printing pastes as thus prepared. After drying, the printed cloth is subjected to a steam ageing process by exposing it for about 10 minutes to the action of steam. The development is completed after the cotton cloth is subjected to rinsing, soaping and finishing in the usual manner.

The printing paste prepared from the dyestuff composition A containing 2-hydroxymethylbenzimidazole yields an olive green shade. The print is stronger, brighter and more level than that produced with the printing paste made from the dyestuff composition B not compounded with 2-hydroxymethylbenzimidazole.

*Example II*

A. A print paste is prepared from the following dyestuff composition:

4 parts of a dry dyestuff composition containing
1.06 parts of the same parent vat dyestuff used in Example I
2 parts 2-hydroxymethylbenzimidazole
4 parts β,β'-dihydroxy diethylsulfide
4 parts of urea and finally dissolving by adding
16 parts warm water and holding in a boiling water bath for 2 minutes The solution is then mixed with:

60 parts of starch-tragacanth thickening and
4 parts of a 35% sodium chlorate solution
2 parts 1% ammonium vanadate solution
2 parts 28% ammonia
2 parts 50% gluconic acid solution B. A print paste is prepared as in A with the exception that the 2-hydroxymethylbenzimidazole is omitted and 18 parts of water are used instead of the 16 parts used in A.

Cotton cloth is printed with a portion of each of the printing pastes A and B. The printing is performed as in Example I.

The printing paste prepared from the dyestuff composition A containing 2-hydroxymethylbenzimidazole yields an olive green shade which is stronger, brighter and more level than that produced with the printing paste made from the dyestuff composition B not compounded with the benzimidazole derivative.

*Example III*

A textile printing paste is prepared as in Example 2 but containing 1.6 grams benzimidazole in place of the 2-hydroxymethylbenzimidazole. Cotton prints were obtained which were more than 20% stronger and brighter than those obtained in the absence of the benzimidazole.

Another portion of each of the printing pastes is permitted to stand for 7 days and then cotton prints are made from each print. The prints made from the paste containing benzimidazole were more than 20% stronger and brighter than the prints obtained from the paste without benzimidazole.

*Example IV*

A textile printing paste is prepared as in Example III, but containing 3.2 parts benzimidazole. Cotton prints were obtained which were more than 20% stronger and brighter than those obtained in the absence of the benzimidazole. Another portion of each of the printing pastes is permitted to stand for 7 days, then printed. The prints made from the composition containing benzimidazole were stronger and brighter than the prints obtained from the composition without benzimidazole.

*Example V*

A. A print paste is prepared from the following dyestuff composition.

4 parts of a dry dyestuff composition containing the disodium salt of the acid sulfuric acid ester of the leuco compound of chlorinated iso-dibenzanthrone (mixture of di- and tri-chlorinated isodibenzanthrone) (equivalent to 1.05 grams of the parent vat dye)

1.6 parts benzimidazole
4.0 parts β,β'-dihydroxy diethylsulfide
4 parts urea and finally dissolving by adding
16 parts warm water and holding in a boiling water bath for 2 minutes.

The solution is then mixed with:

60 parts starch-tragacanth thickening and
4 parts of a 35% sodium chlorate solution
2 parts 1% ammonium vanadate solution
2 parts 28% ammonia
2 parts 50% gluconic acid solution B. A print paste is prepared as in A with the exception that the benzimidazole is omitted and 17.6 parts of water are used instead.

Cotton cloth is printed with a portion of each of the printing pastes A and B. The printing is performed as in Example I.

The printing paste prepared from the dyestuff composition A containing benzimidazole yields prints that are stronger, brighter and smoother than those obtained from printing composition B.

Another portion of each of the printing pastes is permitted to stand for 7 days, then printed. The prints made from the composition containing benzimidazole were stronger and brighter than those obtained from the composition without benzimidazole.

*Example VI*

A. A print paste is prepared from the following dyestuff composition.

4 parts of a dry dyestuff composition containing the disodium salt of the acid sulfuric acid ester of the leuco compound of chlorinated iso-dibenzanthrone (mixture of di- and tri-chlorinated iso-dibenzanthrone) of illustration 5 (equivalent to 1.05 parts of the parent vat dye)
3.2 parts benzimidazole
4 parts β,β'-dihydroxy-diethylsulfide
4 parts urea
16.8 parts warm water and holding in a boiling water bath for 2 minutes The solution is then mixed with:

60 parts starch-tragacanth thickening and
8 parts 16.6% sodium chromate solution B. A print paste is prepared as in A with the exception that the benzimidazole is omitted and water is substituted for it.

Cotton cloth is printed with a portion of each of the printing pastes thus prepared. After drying, the printed cloth is subjected to an acid fume steaming process by exposing it for about 10 minutes to a mixture of acetic and formic acid fumes. The development is completed after the cotton cloth is subjected to rinsing, soaping and finishing in the usual manner.

The cotton prints obtained from the composition A formulated with benzimidazole is stronger and brighter than those obtained from B.

Another portion each of the printing pastes is permitted to stand for 7 days, then printed. The prints made from the composition containing benzimidazole were much stronger, much brighter and smoother than those obtained from the composition without the benzimidazole.

*Example VII*

A. A print paste is prepared from the following dyestuff composition:

4 parts of a dry dyestuff composition containing 1.06 parts of the same parent vat dyestuff used in Example I
1.6 parts benzimidazole
4 parts β,β'-dihydroxy-diethylsulfide and
4 parts urea and finally dissolved by 15.4 parts of warm water and holding in a water bath for 2 minutes.

The solution is then mixed with:

60 parts starch-tragacanth thickening and
4 parts 25% sodium chlorate solution
2 parts 1% ammonium vanadate solution
1 part 28% ammonia and
4 parts ammonium sulfocyanate B. A print paste is prepared as in A with the exception that the benzimidazole is omitted and water is substituted for it.

Cotton prints are made from each of these printing compositions.

The cotton prints obtained from the composition A formulated with benzimidazole are stronger and brighter than those obtained from B.

Another portion each of the printing paste is permitted to stand for 7 days, then printed. The prints made from the composition containing benzimidazole were stronger and brighter than those obtained from the composition without benzimidazole.

*Example VIII*

A powder made up for cotton printing containing the solubilizer dimethyl 3-sulfobenzyl phenyl ammonium betaine prepared according to Example 3 of U.S.P. 2,437,554 and the disodium salt of the acid sulfuric acid ester of the leuco compound of dibromo-anthranthrone of illustration 4.

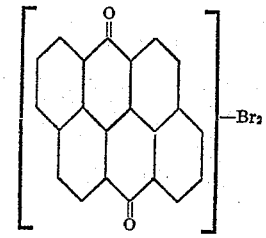

is prepared by intimately mixing in the dry form by grinding together:

100 parts of a dry dyestuff composition containing the disodium salt of the acid sulfuric acid ester of the leuco compound of the above vat dyestuff (equivalent to 53.4 parts of the parent vat dye) with
140 grams the solubilizer of Example 3 of U.S.P. 2,437,554 and
42 parts of cerelose Thus the final concentration of the parent vat dyestuff in this dry composition is 18.9%.

A. A printing paste is prepared from this dry dyestuff composition as follows:

4 parts of the above dry dyestuff composition is mixed with
½ part of 2-hydromethylbenzimidazole
4 parts of β,β'-dihydroxy diethylsulfide
4 parts of urea and finally dissolving by adding 17.5 parts warm water and holding in a boiling water bath for 2 minutes The solution is then mixed with:

60 parts starch-tragacanth thickening and
4 parts of a 35% sodium chlorate solution
2 parts 1% ammonium vanadate solution
2 parts 28% ammonia
2 parts 50% gluconic acid solution B. A similar printing paste is prepared from the dry dyestuff composition but the 2-hydroxymethylbenzimidazole is omitted and in its place water is substituted.

Cotton cloth is printed with a portion of each of the printing pastes as thus prepared. After processing in the usual manner, the cotton prints obtained from printing paste A (containing the hydroxymethylbenzimidazole) are stronger and brighter than those obtained from print paste B without the printing assistant.

Another portion each of the printing pastes is permitted to stand for 7 days and then printed. The prints obtained from A were stronger and brighter than those obtained from B.

*Example IX*

A. A print paste is prepared from the following dyestuff composition:

4 parts of a wet dyestuff composition containing the tetrapotassium salt of the acid sulfuric acid ester 3,3'-dichloro-di-anthrahydroquinone azine

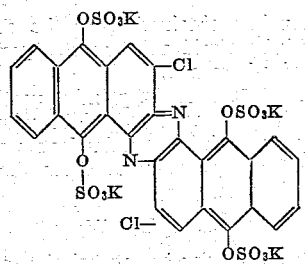

(equivalent to 0.66 parts of the parent vat dyestuff)
0.5 part 2-hydroxymethylbenzimidazole
4 parts $\beta,\beta'$-dihydroxy-diethylsulfide and
4 parts urea and finally dissolved by adding
17.5 parts warm water and holding in a boiling water bath for 2 minutes.

The solution is then mixed with:

60 parts starch-tragacanth thickening and
4 parts of a 35% sodium chlorate solution
2 parts 1% ammonium vanadate solution
2 parts 28% ammonia
2 parts 50% gluconic acid solution B. A similar print paste is prepared but the 2-hydroxymethylbenzimidazole is omitted and water is substituted for it.

Cotton cloth is printed with a portion of each of the printing pastes as thus prepared. The printing is performed in the usual manner as described in Example I. The prints obtained from print paste A were brighter and slightly stronger than those obtained from print paste B in which the 2-hydroxybenzimidazole was omitted.

Another portion each of the printing pastes A and B is permitted to stand for 7 days and then printed. The prints obtained from A were redder and brighter than those obtained from B. Furthermore, the prints obtained from A showed a definite improvement in light and wash fastness.

*Example X*

*Sample A.*—A print paste was prepared as follows:

4 parts of a dry dyestuff composition containing the disodium salt of the sulfuric acid ester of the leuco compound of chlorinated iso-dibenzanthrone (mixture of di- and tri-chlorinated isodibenzanthrone) of illustration 5 (equivalent to 1.05 parts of the parent vat dye)
½ part imidazole
4 parts $\beta,\beta'$-dihydroxy diethyl sulfide
4 parts urea and finally dissolving by adding
16.5 parts warm water and holding in a boiling water bath for 2 minutes The solution is then mixed with—

60 parts starch-tragacanth thickening and
4 parts of a 35% sodium chlorate solution
2 parts 1% ammonium vanadate solution
2 parts 28% ammonia
2 parts 50% gluconic acid solution

*Sample B.*—A print paste is prepared as in A with the exception that the imidazole is omitted and 17 parts of water are used instead.

Cotton cloth is printed with a portion of each of the printing paste A and B. The printing is performed as in Example I.

The printing paste A containing imidazole yields prints that are stronger, brighter and bluer than those obtained from print paste B compounded without imidazole.

*Example XI*

A. A print paste is prepared as follows:

4 parts of a dry dyestuff composition containing the disodium salt of the dyestuff of illustration 3 (equivalent to 1.04 parts of the parent vat dye) ½ part imidazole-4,5-dicarboxylic acid
4 parts $\beta,\beta'$-dihydroxy diethyl sulfide
4 parts urea and finally dissolving by adding 16.5 parts warm water and holding in a boiling water bath for 2 hours The solution is then mixed with 60 parts starch tragacanth thickening and
4 parts of a 35% sodium chlorate solution
2 parts 1% ammonium vanadate solution
2 parts 28% ammonia
2 parts 50% gluconic acid solution B. A print paste is prepared as in A with the exception that the imidazole is omitted and 17 parts of water are used instead.

Cotton cloth is printed with a portion of each of the printing pastes A and B.

The printing paste A containing the imidazole dicarboxylic acid yields prints that are stronger and brighter than those obtained from print paste B compounded without imidazole-dicarboxylic acid.

*Example XII*

A. A print paste is prepared as follows:

4 parts of a paste composition containing the dipotassium salt of the acid sulfuric acid ester of the leuco compound of a dimethoxy-dibenzanthrone of illustration 7 (equivalent to 0.54 part of the parent vat dye)
½ part of 2-aminobenzimidazole
4 parts $\beta,\beta'$-dihydroxy-diethyl sulfide
4 parts urea and finally dissolving by adding
16.5 parts warm water and holding in a boiling water bath for 2 minutes.

The solution is then mixed with 60 parts starch-tragacanth thickening and
4 parts of a 35% sodium chlorate solution
2 parts 1% ammonium vanadate solution
2 parts 28% ammonia
2 parts 50% gluconic acid solution B. A print paste is prepared as in A but the 2-aminobenzimidazole is omitted.

Cotton cloth is printed with a portion of each of the print pastes A and B.

The prints obtained from print paste A containing the 2-aminobenzimidazole were stronger and brighter than those obtained from print paste B formulated without the imidazole derivative.

*Example XIII*

A print paste is prepared from the following dyestuff composition:

4 parts of sulfuric acid ester of leuco form of dinaphthioindigo powder of illustration 9 containing 1.82 grams of the parent naphthioindigo
4 parts of 1-methylbenzimidazole
4 parts $\beta,\beta'$-dihydroxy-diethyl sulfide
4 parts urea and finally dissolved by adding
14 parts of warm water and holding in a boiling water bath for 2 minutes The solution is then mixed with 58 parts of starch-tragacanth thickener and 4 parts of a 35% sodium chlorate solution
2 parts 1% ammonium vanadate solution
2 parts 28% ammonia and
4 parts ammonium sulfocyanate The printing paste containing the 1-methyl-benzimidazole does not show any precipitate even after standing 5 days, whereas the corresponding print paste made without the benzimidazole derivative shows a very heavy precipitate almost immediately.

The paste was printed on cotton and gave level bright brown shades without mottling; a corresponding paste without 1-methyl benzimidazole gave unlevel mottled brown prints of lesser tinctorial value.

*Example XIV*

A. A print paste is prepared from the following dyestuff composition:

4 parts of a dry dyestuff composition containing 1.06 parts of the anthraquinone acridine dyestuff of illustration 1
2 parts of N-(β-cyanoethylbenzimidazole)
4 parts β,β'-dihydroxydiethylsulfide
4 parts of urea and finally dissolving by adding 16 parts warm water and holding in a boiling water bath for 2 minutes.

The solution is then mixed with:

60 parts of starch-tragacanth thickening and
4 parts of a 35% sodium chlorate solution
2 parts 1% ammonium vanadate solution
2 parts 28% ammonium
2 parts 50% gluconic acid solution B. A percent paste is prepared as in A with the exception that the N-(β-cyano-benzimidazole) is omitted and 18 parts of water are used instead of the 16 parts used in A.

Cotton cloth is printed with a portion of each of the printing pastes A and B. After drying, the printed cloth is subjected to a steam ageing process by exposing it for about 10 minutes to the action of steam. The development is completed after the cotton cloth is subjected to rinsing, soaping and finishing in the usual manner.

The prints obtained from print paste composition A is stronger, brighter and more level than that produced with the printing paste made from the dyestuff composition B not compounded with N(β-cyanomethyl)-benzimidazole.

*Example XV*

A. A print paste is prepared from the following dyestuff composition:

4 parts of sulfuric acid ester of leuco form of dinaphthioindigo) powder of illustration 9 containing 1.82 grams of the parent naphthioindigo
4 parts of N-(B-cyanoethylbenzimidazole)
4 parts β,β'-dihydroxy-diethyl sulfide
4 parts urea and finally dissolved by adding
14 parts of warm water and holding in a boiling water bath for 2 minutes The solution is then mixed with 58 parts of starch-tragacanth thickener and
4 parts of a 35% sodium chlorate solution
2 parts 1% ammonium vanadate solution
2 parts 28% ammonia and
4 parts ammonium sulfocyanate B. A print paste is prepared as in A with the exception that the N-(β-cyanoethyl)-benzimidazole is omitted and 18 parts of water are used instead of the 14 parts used in A.

Cotton cloth is printed with a portion of each of the printing pastes as thus prepared after drying, the printed cloth is subjected to a steam ageing process by exposing it for about 10 minutes to the action of steam. The development is completed after the cloth is rinsed, soaped and finished in the usual manner.

The printing paste prepared from the dyestuff composition A containing N-(β-cyanoethyl)-benzimidazole yields a rich brown shade which is stronger, brighter and more level than that produced with the printing paste made from dyestuff composition B. In the latter case the prints are mottled, very weak and fail to develop fully.

Another portion of each of the printing pastes is permitted to stand for 3 days. The print paste containing the N-(β-cyanoethyl)-benzimidazole shows only a slight precipitate whereas the print paste made without the benzimidazole derivative shows a very heavy precipitate almost immediately after original makeup of the paste formulation.

We claim:

1. A dyestuff composition comprising a salt of an acid polybasic acid ester of a leuco vat dyestuff and an azole selected from the group consisting of azoles of the general formulae:

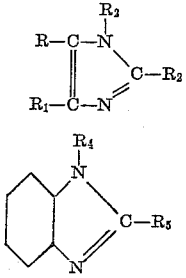

wherein R represents a member selected from the class consisting of hydrogen and phenyl, $R_1$ represents a member selected from the class consisting of hydrogen, lower alkyl, lower aminoalkyl, carboxy, carboxymethyl, carboxyethyl, and phenyl group, $R_2$ represents a member selected from the class consisting of hydrogen, lower alkyl, lower hydroxy alkyl, carboxy, carboxy methyl benzyl, and phenyl group, $R_3$ represents a member selected from the class consisting of hydrogen, lower alkyl, lower hydroxy alkyl, carboxy, carboxy methyl, and phenyl, $R_4$ represents a member selected from the class consisting of acetyl, hydrogen, hydroxy, lower alkyl, and cyano lower alkyl, and $R_5$ represents a member selected from the class consisting of hydrogen, lower alkyl, lower hydroxyalkyl, amino, and 1,2,3,4-tetrahydroxypentyl group.

2. A dyestuff composition according to claim 1 wherein the azole is 2-hydroxymethylbenzimidazole.

3. A dyestuff composition according to claim 1 wherein the azole is benzimidazole.

4. A dyestuff composition according to claim 1 wherein the azole is imidazole.

5. A dyestuff composition according to claim 1 wherein the azole is 2-aminobenzimidazole.

6. A dyestuff composition according to claim 1 wherein the azole is N-(β-cyanoethylbenzimidazole).

References Cited in the file of this patent

UNITED STATES PATENTS

| | | |
|---|---|---|
| 2,024,502 | Berthold | Dec. 17, 1935 |
| 2,372,370 | Duport | Mar. 27, 1945 |
| 2,389,245 | Wiazmitinow | Nov. 20, 1945 |
| 2,406,586 | Clark | Aug. 27, 1946 |
| 2,540,799 | Taras | Feb. 6, 1951 |
| 2,559,807 | Topham | July 10, 1951 |